United States Patent
Kumawat et al.

(10) Patent No.: US 11,410,172 B2
(45) Date of Patent: Aug. 9, 2022

(54) METHODS AND SYSTEMS FOR VERIFICATION OF OPERATIONS OF COMPUTER TERMINALS AND PROCESSING NETWORKS

(71) Applicant: MASTERCARD INTERNATIONAL INCORPORATED, Purchase, NY (US)

(72) Inventors: Jaipal Singh Kumawat, Rajasthan (IN); Vipul Mehrotra, Uttar Pradesh (IN); Gurpreet Atwal, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 130 days.

(21) Appl. No.: 16/731,452

(22) Filed: Dec. 31, 2019

(65) Prior Publication Data

US 2021/0201313 A1   Jul. 1, 2021

(51) Int. Cl.
*G06Q 20/40* (2012.01)
*G06F 11/26* (2006.01)

(52) U.S. Cl.
CPC .............. *G06Q 20/40* (2013.01); *G06F 11/26* (2013.01)

(58) Field of Classification Search
CPC ............................... G06Q 20/00; G06Q 20/40
USPC ........................................................ 705/44
See application file for complete search history.

(56) References Cited

U.S. PATENT DOCUMENTS

| | | | |
|---|---|---|---|
| 7,130,885 B2 * | 10/2006 | Chandra | G06Q 10/107 709/224 |
| 9,959,443 B1 | 5/2018 | Suthar et al. | |
| 10,127,538 B2 | 11/2018 | Saeed et al. | |
| 2011/0078025 A1 | 3/2011 | Shrivastav | |
| 2012/0290420 A1 | 11/2012 | Close | |
| 2015/0235208 A1 | 8/2015 | Murphy et al. | |
| 2015/0262310 A1 * | 9/2015 | Howe | G06Q 20/202 705/30 |
| 2016/0321663 A1 | 11/2016 | Batlle | |
| 2017/0011368 A1 | 1/2017 | Trombino | |
| 2017/0236125 A1 * | 8/2017 | Guise | H04W 4/80 705/17 |
| 2017/0249667 A1 | 8/2017 | Castrechini et al. | |
| 2017/0344991 A1 | 11/2017 | Mark et al. | |

(Continued)

*Primary Examiner* — Joseph W. King
*Assistant Examiner* — Liz P Nguyen
(74) *Attorney, Agent, or Firm* — Armstrong Teasdale LLP (57) ABSTRACT

A verification computing system for verifying operation of a payment terminal and a payment processing network linking the payment terminal to a payment processor is provided. The verification computing system includes at least one verification computing module including at least one processor. The verification computing module is programmed to receive a test request message corresponding to a test payment card transaction from the payment terminal, identify a void flag included in the test request message, and bypass a settlement process for the test payment card transaction based on the identified void flag. The verification computing module is further configured to determine an operating status of the payment terminal and the payment processing network, generate a test response message based upon the determination, and transmit the test response message to the payment terminal for notifying a user.

17 Claims, 8 Drawing Sheets

(56) References Cited

U.S. PATENT DOCUMENTS

| | | |
|---|---|---|
| 2018/0268408 A1 | 9/2018 | Botros et al. |
| 2019/0087813 A1 | 3/2019 | Wilson |
| 2020/0273043 A1* | 8/2020 | Murphy ............. G06Q 20/4016 |

* cited by examiner

METHODS AND SYSTEMS FOR VERIFICATION OF OPERATIONS OF COMPUTER TERMINALS AND PROCESSING NETWORKS

BACKGROUND

This disclosure relates generally to operations of computer terminals and, more particularly, to network-based methods and systems for verifying operations of payment terminals and payment processing networks.

Consumers and merchant benefit from the use of payment terminals, such as automated teller machines (ATMs) and point-of-sale (POS) systems, to initiate payment card transactions using transaction cards. The potential for fraudulent transactions using transaction cards is a major concern for financial institutions, merchants, and consumers. Transaction card information and personal information about a consumer are susceptible to being obtained by theft. For example, fraudsters may infiltrate legitimate corporations and use their employment as a means for acquiring consumer and/or transaction card information, and subsequently use the information to commit fraud. For example, one type of fraud, referred to as "skimming," usually occurs when the transaction card information is obtained electronically (e.g., using a payment terminal) and/or physically from the transaction card at a legitimate merchant or financial institution. What typically happens is that the consumer proffers his or her transaction card at the merchant or financial institution to initiate a payment card transaction. The relevant information is electronically and/or physically copied from the transaction card and the transaction card is subsequently reproduced, creating a counterfeit transaction card.

One indication of skimming may be a payment terminal not working properly in response to a card interaction. For example, when a payment terminal is non-responsive to a payment card being inserted, swiped, or tapped, the consumer and/or the merchant may suspect that the payment terminal has compromised the payment card. Therefore, the consumer and/or merchant may not desire to proceed with the payment transaction. However, payment terminals are occasionally non-responsive for non-fraud related reasons, such as delay in getting a response from the payment processing network.

Therefore, a verification method is needed which is capable of determining in-real time whether a payment terminal is working properly at the time a payment card transaction is initiated or being processed.

BRIEF DESCRIPTION

In one aspect, a verification computing system for verifying operation of a payment terminal and a payment processing network linking the payment terminal to a payment processor is provided. The verification computing system includes at least one verification computing module including at least one processor programmed to receive, via the payment processing network, a test request message from the payment terminal, the test request message initiated by a user and corresponding to a test payment card transaction, the test request message including at least a test account number and a void flag. The at least one processor is also configured to identify the void flag included in the test request message, bypass a settlement process for the test payment card transaction based on the identified void flag, and determine an operating status of the payment terminal and the payment processing network by analyzing at least one of i) a connectivity between the payment terminal and the payment processor, ii) a transmission time of the test request message, and iii) a data integrity of the test request message. The at least one processor is further configured to generate a test response message based upon the determination, the test response message including an indication of the status of the payment processing network and the payment terminal, and transmit the test response message, via the payment processing network, to the payment terminal for notifying the user.

In another aspect, a computer-implemented method for verifying operation of a payment terminal and a payment processing network linking the payment terminal to a payment processor is provided. The method is implemented by at least one verification computing module that includes at least one processor in communication with a database. The method includes receiving, via the payment processing network, a test request message from the payment terminal, the test request message initiated by a user and corresponding to a test payment card transaction, the test request message including at least a test account number and a void flag. The method also includes identifying the void flag included in the test request message, bypassing a settlement process for the test payment card transaction based on the identified void flag, and determining an operating status of the payment terminal and the payment processing network by analyzing at least one of i) a connectivity between the payment terminal and the payment processor, ii) a transmission time of the test request message, and iii) a data integrity of the test request message. The method further includes generating a test response message based upon the determination, the test response message including an indication of the status of the payment processing network and the payment terminal, and transmitting the test response message, via the payment processing network, to the payment terminal for notifying the user.

In yet another aspect, a non-transitory computer readable medium that includes computer-executable instructions embodied thereon is provided. When the computer-executable instructions are executed by at least verification computing module that includes at least one processor in communication with a database, the computer-executable instructions cause the verification computing module to receive, via a payment processing network linking a payment terminal to a payment processor, a test request message from the payment terminal, the test request message initiated by a user and corresponding to a test payment card transaction, the test request message including at least a test account number and a void flag. The computer-executable instructions also cause the verification computing module to identify the void flag included in the test request message, bypass a settlement process for the test payment card transaction based on the identified void flag, and determine an operating status of the payment terminal and the payment processing network by analyzing at least one of i) a connectivity between the payment terminal and the payment processor, ii) a transmission time of the test request message, and iii) a data integrity of the test request message. The computer-executable instructions further cause the verification computing module to generate a test response message based upon the determination, the test response message including an indication of the status of the payment processing network and the payment terminal, and transmit the test response message, via the payment processing network, to the payment terminal for notifying the user.

BRIEF DESCRIPTION OF THE DRAWINGS

FIGS. 1-6 show exemplary embodiments of the method and system described herein.

DETAILED DESCRIPTION

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

A verification computing system configured to verify operation of payment terminals (also referred to herein as computer terminals or computer payment terminals) and payment processing networks is described herein. The verification computing system includes at least one verification computing module including, at least one processor in communication with at least one payment terminal and at least one payment processing network. The payment terminal is associated with an entity, such as a merchant or an issuer of a payment card. The verification computing module is further in communication with at least one database that may store and/or process data, such as payment terminal data. The payment terminal data may include, among other data, an entity identifier, an entity name, an entity address, a payment terminal identifier, an entity type (e.g., merchant or issuer), entity account data (e.g., entity bank or acquirer bank information, or other account related information), and metadata associated with each entity location (e.g., hours of operation, applicable sales taxes, entity-imposed fees, among other metadata associated with each entity location).

In the example embodiment, the verification computing module is configured to cooperate with a test functionality of the payment terminal so that the payment terminal is capable of performing "test" payment card transactions to verify that the payment terminal is working properly. The term "test" payment card transactions, as described herein, refers to payment card transactions that are initiated at the payment terminal using the test functionality, and that include a flag (e.g., a void flag) indicating that the payment card transactions are submitted for test of the payment terminal and no fee charges should be incurred by any party (e.g., issuer, merchant, acquirer, and/or payment processing network) to the test payment card transactions. The test functionality enables the payment terminal to generate and transmit test request messages, and receive test response messages for the test payment card transactions, as discussed below. In some embodiments, the verification computing module implements the test functionality on the payment terminal by uploading a test snippet. The test snippet includes computer-executable code that, when executed by the payment terminal, causes the payment terminal to run the test functionality. The execution of the computer-executable code may cause a graphical user interface (GUI) of the payment terminal to display a menu option to a user to select the test functionality. Alternatively, the execution of the computer-executable code may program a physical control (e.g., pushbutton) of the payment terminal to execute the test functionality. Alternatively, the physical control of the payment terminal is pre-programmed to initiate or execute the test functionality. Alternatively, the execution of the computer-executable code may cause the test functionality to be triggered by the use of a special test card.

In the example embodiment, the payment terminal may initiate the test payment card transaction by enabling a user (e.g., a consumer, a merchant, or an issuer), desiring to initiate a payment card transaction, to select a test on the payment terminal that triggers the test functionality. The payment terminal may display the test option on a GUI in the form of a button or an icon, as a physical control, or in any other suitable fashion that enables the user to select the test option associated with the payment terminal. The user may also select a type of payment processing network (e.g., Mastercard®, VISA®, Discover®, American Express®, etc.) associated with the test payment card transaction. In some embodiments, a special test card is associated with the payment terminal. The user swipes, inserts, or taps the test card on the payment terminal to initiate the test payment card transaction. In these embodiments, the test card includes a test account number (e.g., a test account identifier) that is used to process the test payment card transaction, instead of a primary account number (PAN) of a consumer payment card. Alternatively, a test account number may be pre-programmed into the test functionality at the payment terminal. The test account number may be a unique number identifying each payment terminal and may be associated with each type of payment processing network. The test account number may be sufficient to identify the associated payment processing network.

Once the user selects the test function, the payment terminal is configured to generate and transmit a test request message to the payment processing network. In the example embodiment, the test request message includes, among other data points, the test account number of the payment terminal. The test account number is associated with an account previously registered with the verification computing system. The registered account corresponds to an entity associated with the payment terminal. As stated above, the entity may include a merchant, e.g., for a retail point-of-sale (POS) terminal, or an issuer of the payment card, e.g., for an automated teller machine (ATM).

The test request message may be formatted as a standard payment card interchange authorization request message (e.g., ISO 8583) but with the test account number in the PAN field instead of a PAN of a consumer payment card. A test transaction amount may be entered at the payment terminal and included in the test request message. For example, the payment terminal may request the user or consumer to input any dummy transaction amount, or a nominal amount equal or less than one U.S. dollar ($1.00 USD). In some embodiments, the test functionality of the payment terminal also inserts a void flag into the test request message in response to recognizing the test account number. In other embodiments, the payment processing network inserts the void flag into the test request message in response to recognizing the test account number. The void flag indicates to the payment processing network and/or the verification computing module that the payment card transaction is a test payment card transaction.

In the example embodiment, at least one server of the payment processing network is configured to parse the PAN field of the test request message, retrieve the test account number, and identify the test account number as a registered account for the test functionality. In response to identifying that the PAN field contains the test account number, the payment processing network routes the test request message to the verification computing module. The verification computing module is configured to process the test payment card transaction similar to a standard payment card transaction, as described in more detail below. For example, the verification computing module is configured to determine that the registered account is associated with an operator (e.g., a merchant or an issuer) of the payment terminal, so that the test payment card transaction amount is effectively credited and debited from the merchant's account to the merchant's account (in the case of a retail POS terminal) or from the issuer's account to the issuer's account (in the case of an ATM). However, the test payment card transaction processing differs from the standard payment card transaction processing in that the test payment card transaction processing does not include a payment settlement. The verification computing module is configured to determine that no payment settlement is required (i.e., the payment card transaction is a test payment card transaction) by identifying the void flag included in the test request message. In other words, the verification computing module is configured to bypass a settlement process for the test payment card transaction based on the identified void flag. In addition, in some embodiments, the verification computing module is configured, in response to identifying the void flag, to eliminate any fees that could be associated with a standard payment card transaction using the payment terminal and the payment processing network, rendering the test functionality free of charge.

Upon processing the test payment card transaction, the verification computing module generates and transmits a test response message to the payment terminal. The payment terminal is configured to display a status of the payment processing network based on the test response message. For example, the payment terminal displays a text string indicating that the test payment card transaction was completed successfully. The display may include one or more of the test payment card transaction amount and timestamps. By displaying the results of the processing, the payment terminal notifies the user that the payment terminal and the payment processing network are working properly. On the other hand, if the test response message is not generated by the verification computing module within a predefined time limit (e.g., the processing time of the test payment card transaction exceeds a time threshold, such as a service-level agreement (SLA) time) or contains information inconsistent with the test request message (e.g., data alteration), the verification computing module is configured to determine that the payment terminal, the payment processing network, or both are not working properly. In other words, the verification computing module is configured to compare the processing time of the transaction, including the time needed to generate the test response message to predefined time thresholds to determine whether the processing is within the predefined limit. The verification computing module is also configured to compare the data included in the test request message to data to be included in the test response message to determine whether the data includes inconsistencies indicative of data alteration.

The verification computing module is also configured to transmit to the payment terminal the test response message including a status notification indicating that the payment terminal, the payment processing network, or both are not working properly based upon the determination. The payment terminal is configured to display the status of the payment processing network and/or the payment terminal based on the test response message. For example, the payment terminal displays a text string indicating that i) the test payment card transaction was not completed successfully, ii) the payment processing network, the payment terminal, or both are currently out of service, or iii) suggest a re-test or corrective.

In some embodiments, the payment terminal is configured to determine that the payment terminal, the payment processing network, or both are not working properly based on the criteria discussed above with respect to the verification computing module. Further, if the test response message is not received by the payment terminal within a predefined time limit (e.g., there is no connectivity with the verification computing module), the payment terminal is configured to determine that the payment terminal, the payment processing network, or both are not working properly, and display the text string indicating that i) the test payment card transaction was not completed successfully, ii) the payment processing network, the payment terminal, or both are currently out of service, or iii) suggest a re-test or corrective.

In some embodiments, where the payment terminal is an ATM and the test response message includes information indicating that the test payment card transaction was completed successfully, the ATM may also notify the user of the amount of money that the ATM currently holds up to withdrawal limit.

The technical problems addressed by the disclosure include at least one of: (i) data safety risks associated with compromised payment terminals, (ii) data safety risks associated with compromised payment processing networks, (iii) data safety risks associated with insecure transmission of account and consumer information, and (iv) unnecessary payment card transactions declines.

The resulting technical benefits achieved by the systems and methods of the disclosure include at least one of: (i) improved functionality of payment terminals by adding a technical feature to the payment terminals, and (ii) reduced unsecured transmission of account and consumer information.

The systems and methods of the disclosure are implemented using computer programming or engineering techniques including computer software, firmware, hardware, or any combination or subset thereof, wherein the technical effects are achieved by: (i) receiving, via the payment processing network, a test request message from the payment terminal, the test request message initiated by a user and corresponding to a test payment card transaction, the test request message including at least a test account number and a void flag; (ii) identifying the void flag included in the test request message; (iii) bypassing a settlement process for the test payment card transaction based on the identified void flag; (iv) determining an operating status of the payment terminal and the payment processing network by analyzing at least one of a) a connectivity between the payment terminal and the payment processor, b) a transmission time of the test request message and c) a data integrity of the test request message; (v) generating a test response message based upon the determination, the test response message including an indication of the status of the payment processing network and the payment terminal; and (vi) transmitting the test response message, via the payment processing network, to the payment terminal for notifying the user.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calilf.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Figure 1:
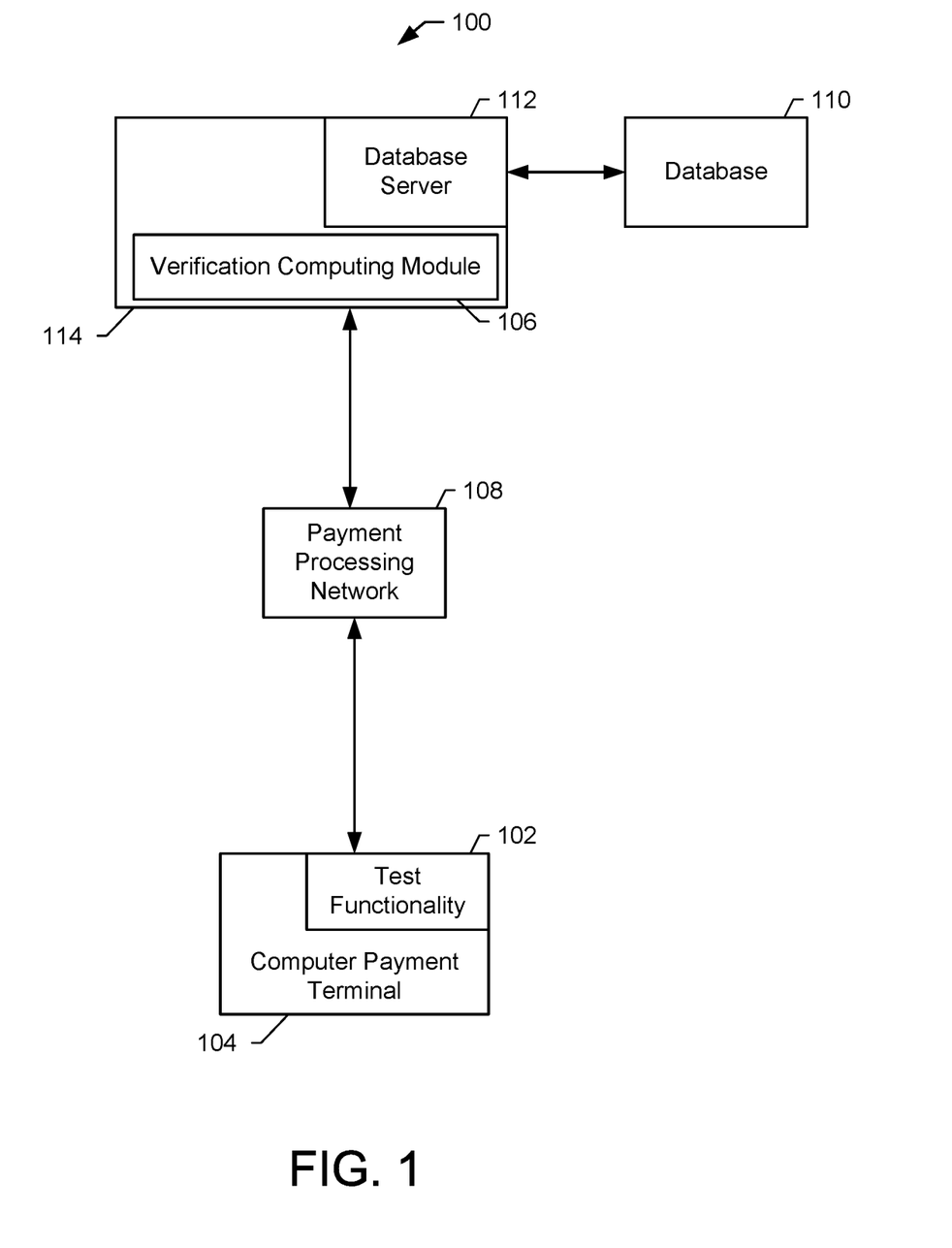
FIG. 1 is a simplified schematic diagram of a verification computing system using an add-on test functionality in a payment terminal.

FIG. 1 is a simplified schematic diagram of a verification computing system 100 using an add-on test functionality 102 in a payment terminal 104. Verification computing system 100 includes at least one verification computing module 106 including at least one processor in communication with at least one payment terminal 104 and at least one payment processing network 108. In the example embodiment, verification computing module 106 is implemented on a server 114 of payment processing network 108. Alternatively, verification computing module 106 is implemented on a separate computing device. Payment terminal 104 is associated with an entity (not shown), such as a merchant or an issuer of a payment card. Verification computing module 106 is further in communication with at least one database 110 that may store and/or process data, such as payment terminal data. A database server 112 may be in communication with database 110, which contains information on a variety of matters, as described below in greater detail. In one embodiment, database 110 is stored on server 114 and may be accessed by logging onto server 114 and/or verification computing module 106 through a user computing device (not shown) or payment terminal 104. In an alternative embodiment, database 110 is stored remotely from server 114 and may be non-centralized. Payment terminal 104, verification computing module 106, payment processing network 108, and server 114 may be interconnected to the Internet through many interfaces including a network, such as a local area network (LAN) or a wide area network (WAN), dial-in-connections, cable modems, and special high-speed ISDN lines.

In the example embodiment, verification computing module 106 is configured to cooperate with test functionality 102 of payment terminal 104 so that payment terminal 104 is capable of performing "test" payment card transactions to verify that payment terminal 104 is working properly. Test functionality 102 enables payment terminal 104 to generate and transmit test request messages, and receive test response messages for the test payment card transactions, as discussed below. In some embodiments, verification computing module 106 implements test functionality 102 on payment terminal 104 by uploading a test snippet. The test snippet includes computer-executable code that, when executed by payment terminal 104, causes the payment terminal to run test functionality 102. The execution of the computer-executable code may cause a graphical user interface (GUI) of payment terminal 104 to display a menu option to a user to select test functionality 102. Alternatively, the execution of the computer-executable code may program a physical control (e.g., push-button) of payment terminal 104 to execute test functionality 102. Alternatively, the physical control of payment terminal 104 is pre-programmed to initiate or execute test functionality 102. Alternatively, the execution of the computer-executable code may cause test functionality 102 to be triggered by the use of a special test card.

In the example embodiment, payment terminal 104 may initiate the test payment card transaction by enabling a user (e.g., a consumer, a merchant, or an issuer), desiring to initiate a payment card transaction, to select a test option on payment terminal 104 that triggers test functionality 102. Payment terminal 104 may display the test option on a GUI in the form of a button or an icon, as a physical control, or in any other suitable fashion that enables the user to select the test option associated with the payment terminal. The user may also select a type of payment processing network (e.g., Mastercard®, VISA®, Discover®, American Express®, etc.) associated with the test payment card transaction. In some embodiments, a special test card is associated with payment terminal 104. The user swipes, inserts, or taps the test card on payment terminal 104 to initiate the test payment card transaction. In these embodiments, the test card includes a test account number (e.g., a test account identifier) that is used to process the test payment card transaction, instead of a primary account number (PAN) of a consumer payment card. Alternatively, a test account number may be pre-programmed into test functionality 102 at payment terminal 104. The test account number may be a unique number identifying payment terminal 104 and may be associated with each type of payment processing network.

Once the user selects the test function, payment terminal 104 is configured to generate and transmit a test request message to payment processing network 108. In the example embodiment, the test request message includes, among other data points, the test account number of payment terminal 104. The test account number is associated with an account previously registered with verification computing system 100. The registered account corresponds to an entity associated with payment terminal 104.

The test request message may be formatted as a standard payment card interchange authorization request message (e.g., ISO 8583) but with the test account number in the PAN field. A test transaction amount may be entered at payment terminal 104 and included in the test request message. In some embodiments, test functionality 102 of payment terminal 104 also inserts a void flag into the test request message. In other embodiments, payment processing network 108 inserts the void flag into the test request message. The void flag indicates to payment processing network 108 and/or verification computing module 106 that the payment card transaction is a test payment card transaction.

In the example embodiment, server 114 is configured to parse the PAN field of the test request message, retrieve the test account number, and identify the test account number as a registered account for test functionality 102, e.g., by comparison to a list of test account numbers registered for test functionality 102 that is stored in database 110. In response to identifying that the PAN field includes the test account number, payment processing network 108 routes the test request message to verification computing module 106. Verification computing module 106 is configured to process the test payment card transaction similar to a standard payment card transaction, as described in more detail below. However, the test payment card transaction processing differs from the standard payment card transaction processing in that the test payment card transaction processing does not include a payment settlement. Verification computing module 106 is configured to determine that no payment settlement is required (i.e., the payment card transaction is a test payment card transaction) by identifying the void flag included in the test request message. In other words, verification computing module 106 is configured to bypass a settlement process for the test payment card transaction based on the identified void flag. In addition, in some embodiments, verification computing module 106 is configured, in response to identifying the void flag, to eliminate any fees that could be associated with a standard payment card transaction using payment terminal 104 and payment processing network 108, rendering test functionality 102 free of charge.

Upon processing the test payment card transaction, verification computing module 106 generates and transmits a test response message to payment terminal 104. The test response message includes data indicative of the performance (e.g., performance data) of payment processing network 108. For example, the test response message may include a test payment card transaction amount, a timestamp of receipt of the test request message by payment processing network 108, a timestamp of transmission of the test response message from payment processing network 108, and any other suitable performance information. Verification computing module 106 may be configured to store the performance data within a database, such as database 110 and/or database 112. Payment terminal 104 is configured to display a status of payment processing network 108 based on the test response message. For example, payment terminal 104 displays a text string indicating that the test payment card transaction was completed successfully. The display may include one or more of the test payment card transaction amount and the timestamps. By displaying the results of the processing, payment terminal 104 notifies the user that payment terminal 104 and payment processing network 108 are working properly.

On the other hand, if the test response message is not is not generated by verification computing module 106 within a predefined time limit (e.g., the processing time of the test payment card transaction exceeds a time threshold, such as a service-level agreement (SLA) time) or contains information inconsistent with the test request message (e.g., data alteration), verification computing module 106 is determine that payment terminal 104, payment processing network 108, or both are not working properly. In other words, verification computing module 106 is configured to compare the processing time of the transaction, including the time needed to generate the test response message to predefined time thresholds to determine whether the processing is within the predefined limit. Verification computing module 106 is also configured to compare the data included in the test request message to data to be included in the test response message to determine whether the data includes inconsistencies indicative of data alteration.

Verification computing module 106 is also configured to transmit to payment terminal 104 the test response message including a status notification indicating that payment terminal 104, payment processing network 106, or both are not working properly based upon the determination. Payment terminal 104 is configured to display the status of payment processing network 108 and/or payment terminal 104 based on the test response message. For example, payment terminal 104 displays a text string indicating that i) the test payment card transaction was not completed successfully, ii) payment processing network 108, payment terminal 104, or both are currently out of service, or iii) suggest a re-test or corrective.

In some embodiments, payment terminal 104 is configured to determine that payment terminal 104, payment processing network 108, or both are not working properly based on the criteria discussed above with respect to verification computing module 106. Further, if the test response message is not received by payment terminal 104 within a predefined time limit (e.g., there is no connectivity with verification computing module 106), payment terminal 104 is configured to determine that payment terminal 104, payment processing network 108, or both are not working properly, and display the text string indicating that i) the test payment card transaction was not completed successfully, ii) payment processing network 108, payment terminal 104, or both are currently out of service, or iii) suggest a re-test or corrective.

In some embodiments, where payment terminal 104 is an ATM and the test response message includes information indicating that the test payment card transaction was completed successfully, the ATM may also notify the user of the amount of money that the ATM currently holds up to withdrawal limit as a further informational benefit to the user.

Figure 2:
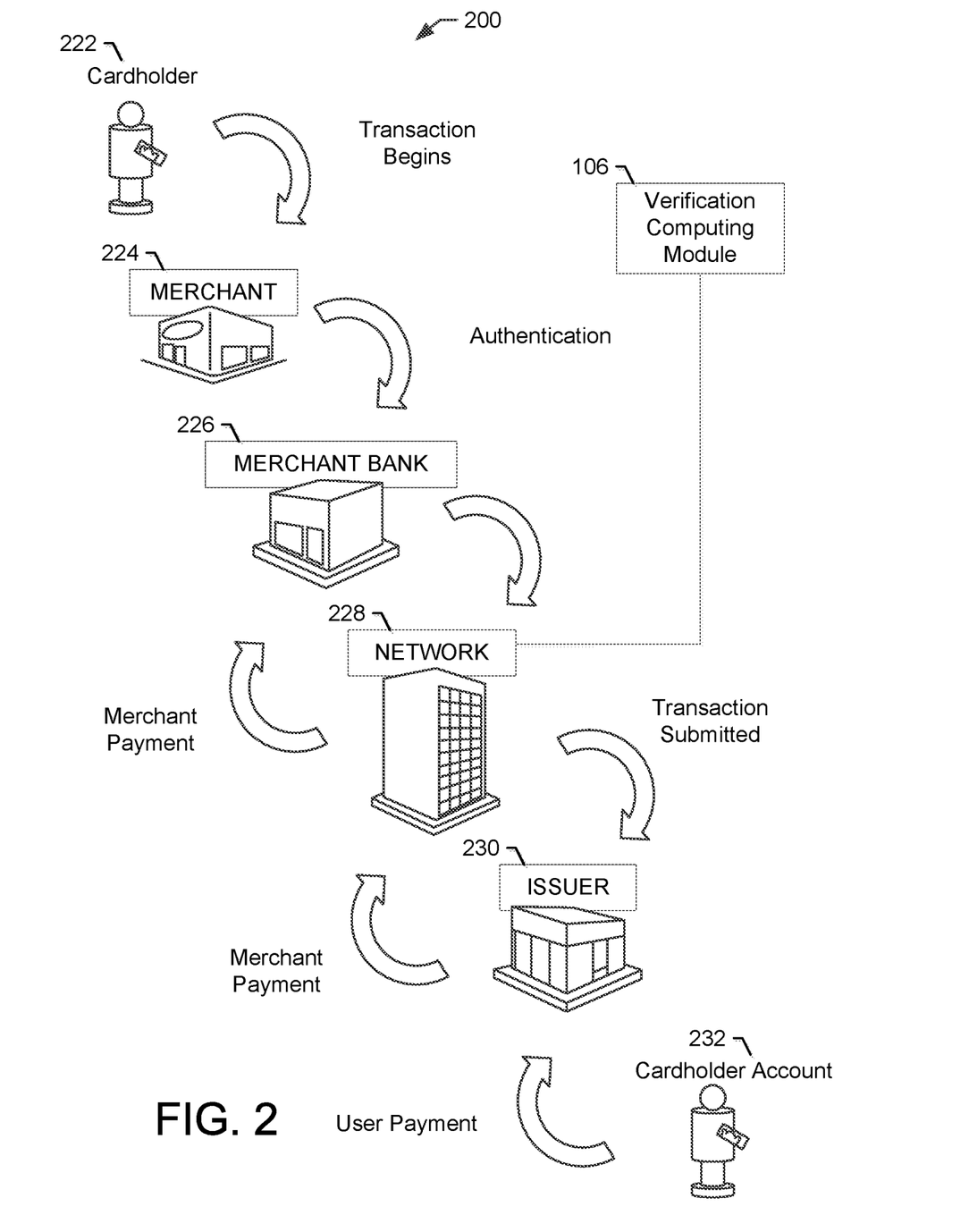
FIG. 2 is a schematic diagram illustrating an exemplary multi-party payment card system including the verification computing system shown in FIG. 1.

FIG. 2 is a schematic diagram illustrating an example multi-party transaction card industry system 200 for enabling ordinary payment-by-card transactions, including payment-by-card transactions made by cardholders, such as cardholder 222 (e.g., a consumer), using a payment terminal, such as payment terminal 104 (shown in FIG. 1), to initiate transactions at merchant 224. Merchant 224 and issuer bank 230 do not need to have a one-to-one special relationship. Typical financial transaction institutions provide a suite of interactive, online applications to both current and prospective customers. For example, a financial transactions institution may have a set of applications that provide informational and sales information on their products and services to prospective customers, as well as another set of applications that provide account access for existing cardholders.

Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

In a typical transaction card system, a financial institution called the "issuer" issues a transaction card, such as a credit card, to a customer, a consumer, or cardholder 222, who uses the transaction card to tender payment for a purchase from a merchant 224. Cardholder 222 may purchase goods and services ("products") at merchant 224. Cardholder 222 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 224 must normally establish an account with a financial institution that is part of the financial payment system. This financial institution is usually called the "merchant bank," the "acquiring bank," or the "acquirer." When cardholder 222 tenders payment for a purchase with a transaction card or virtual transaction card, merchant 224 requests authorization from a merchant bank 226 for the amount of the purchase. The request may be performed over the telephone or electronically, but is usually performed through the use of payment terminal 104 implemented as a point-of-sale terminal. In some embodiments, payment terminal 104 implemented as an ATM is used by cardholder 222 instead of merchant 224. Payment terminal 104 reads cardholder's 222 account information from a magnetic stripe, a chip, or embossed characters on the transaction card and communicates electronically with the transaction processing computers of merchant bank 226. Merchant bank 226 receives cardholder's 222 account information as provided by cardholder 222. Alternatively, merchant bank 226 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 228, such as payment processing network 108 (shown in FIG. 1), computers of merchant bank 226 or merchant processor will communicate with computers of an issuer bank 230 to determine whether cardholder's 222 account 232 is in good standing and whether the purchase is covered by cardholder's 222 available credit line. Based on these determinations, the request for authorization will be declined or accepted in an authorization response message. If the request is accepted, an authorization code is issued to merchant 224.

When a request for authorization is accepted, the available credit line of cardholder's 222 account 232 is decreased. Normally, a charge for a payment card transaction is not posted immediately to cardholder's 222 account 232 because bankcard associations, such as MasterCard International Incorporated®, have promulgated rules that do not allow merchant 224 to charge, or "capture," a transaction until products are shipped or services are delivered. However, with respect to at least some debit card transactions, a charge may be posted at the time of the transaction. When merchant 224 ships or delivers the products or services, merchant 224 captures the transaction by, for example, appropriate data entry procedures on the point-of-sale terminal. This may include bundling of approved transactions daily for standard retail purchases. If cardholder 222 cancels a transaction before it is captured, a "void" is generated. If cardholder 222 returns products after the transaction has been captured, a "credit" is generated. Interchange network 228 and/or issuer bank 230 stores the transaction card information, such as a type of merchant, amount of purchase, date of purchase, in a database, such as database 110 (shown in FIG. 1).

After a purchase has been made, a clearing process occurs to transfer additional transaction data related to the purchase among the parties to the transaction, such as merchant bank 226, interchange network 228, and issuer bank 230. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including verification computing module 106. In the example embodiment, interchange network 228 provides such transaction data and additional transaction data. In alternative embodiments, any party may provide such data to verification computing module 106.

After a transaction is authorized and cleared, the transaction is settled among merchant 224, merchant bank 226, and issuer bank 230. Settlement refers to the transfer of financial data or funds among merchant's 224 account, merchant bank 226, and issuer bank 230 related to the transaction. Usually, transactions are captured and accumulated into a "batch," which is settled as a group. More specifically, a transaction is typically settled between issuer bank 230 and interchange network 228, and then between interchange network 228 and merchant bank 226, and then between merchant bank 226 and merchant 224.

Figure 3:
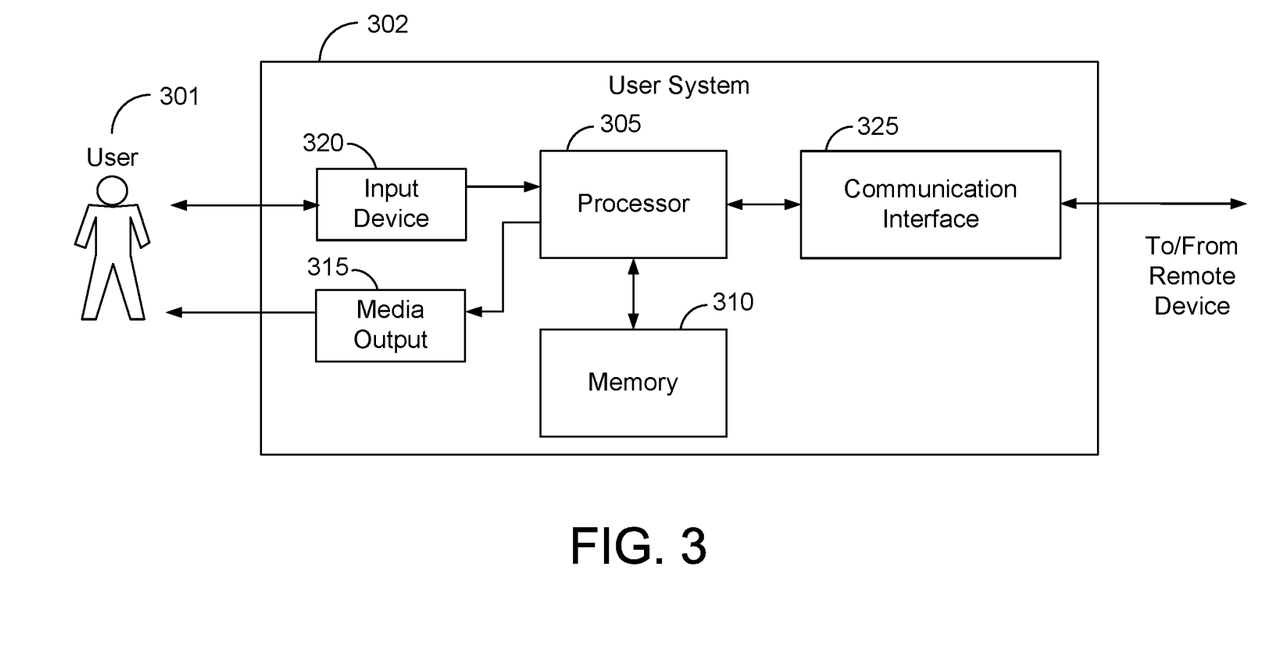
FIG. 3 illustrates an example configuration of a payment terminal included in the verification computing system shown in FIG. 1

FIG. 3 illustrates an example configuration of a user system 302 operated by a user 301, such as an operator of payment terminal 104 (shown in FIG. 1). In the example embodiment, user system 302 may be used to implement payment terminal 104, and may be used by user 301 to interact with verification computing system 100 (shown in FIG. 1). More specifically, user system 302 may be used to access verification computing module 106 (shown in FIG. 1) to verify operation of user system 302 and payment processing network 108 (shown in FIG. 1). In the example embodiment, user system 302 includes a processor 305 for executing instructions. In some embodiments, executable instructions are stored in a memory area 310. Processor 305 may include one or more processing units, for example, a multi-core configuration. Memory area 310 is any device allowing information such as executable instructions and/or written works to be stored and retrieved. Memory area 310 may include one or more computer readable media.

User system 302 also includes at least one media output component 315 for presenting information to user 301. Media output component 315 is any component capable of conveying information to user 301. In some embodiments, media output component 315 includes an output adapter such as a video adapter and/or an audio adapter. An output adapter is operatively coupled to processor 305 and operatively couplable to an output device such as a display device, a liquid crystal display (LCD), organic light emitting diode (OLED) display, or "electronic ink" display, or an audio output device, a speaker or headphones.

In some embodiments, user system 302 includes at least one input device 320 for receiving input from user 301. Input device 320 includes a payment card reader, such as a magnetic card strip reader, a chip media, a card-tap reader, a digital wallet interface, etc. Input device 320 may further include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 315 and input device 320. User system 302 may also include a communication interface 325, which is communicatively couplable to a remote device, such as verification computing module 106 and payment processing network 108. Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 310 are, for example, computer readable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website from verification computing system 100. A client application allows user 301 to interact with a server application from verification computing system 100, such as test functionality 102 (shown in FIG. 1).

Figure 4:
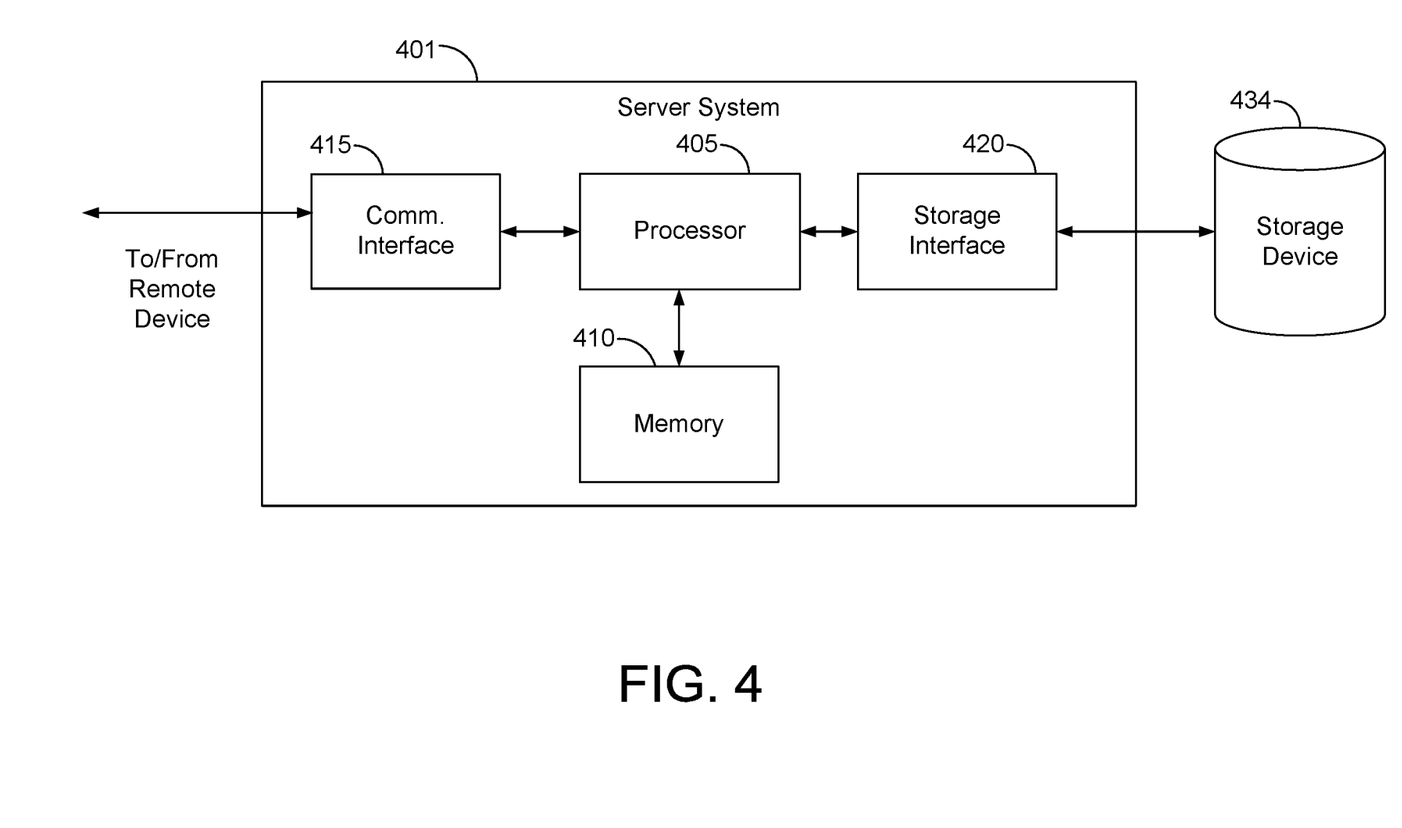
FIG. 4 illustrates an example configuration of a server system that may be included in the verification computing system shown in FIG. 1.

FIG. 4 illustrates an example configuration of a server system 401 that may be used to implement server 114 and/or verification computing module 106 (both shown in FIG. 1). Server system 401 may include, but is not limited to, verification computing module 106 and database server 112 (both shown in FIG. 1). In the example embodiment, server system 401 is configured to verify operation of payment terminal 104 and payment processing network 108 (both shown in FIG. 1).

Server system 401 includes a processor 405 for executing instructions. Instructions may be stored in a memory area 410, for example. Processor 405 may include one or more processing units (e.g., in a multi-core configuration) for executing instructions. The instructions may be executed within a variety of different operating systems on server system 401, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 405 is operatively coupled to a communication interface 415 such that server system 401 is capable of communicating with a remote device such as payment terminal 104, payment processing network 108, or another server system 401. For example, communication interface 415 may receive requests from payment terminal 104 via the Internet, as discussed above.

Processor 405 may also be operatively coupled to a storage device 434. Storage device 434 is any computer-operated hardware suitable for storing and/or retrieving data. In some embodiments, storage device 434 is integrated in server system 401. For example, server system 401 may include one or more hard disk drives as storage device 434. In other embodiments, storage device 434 is external to server system 401 and may be accessed by a plurality of server systems 401. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420.

Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory area 410 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5A:
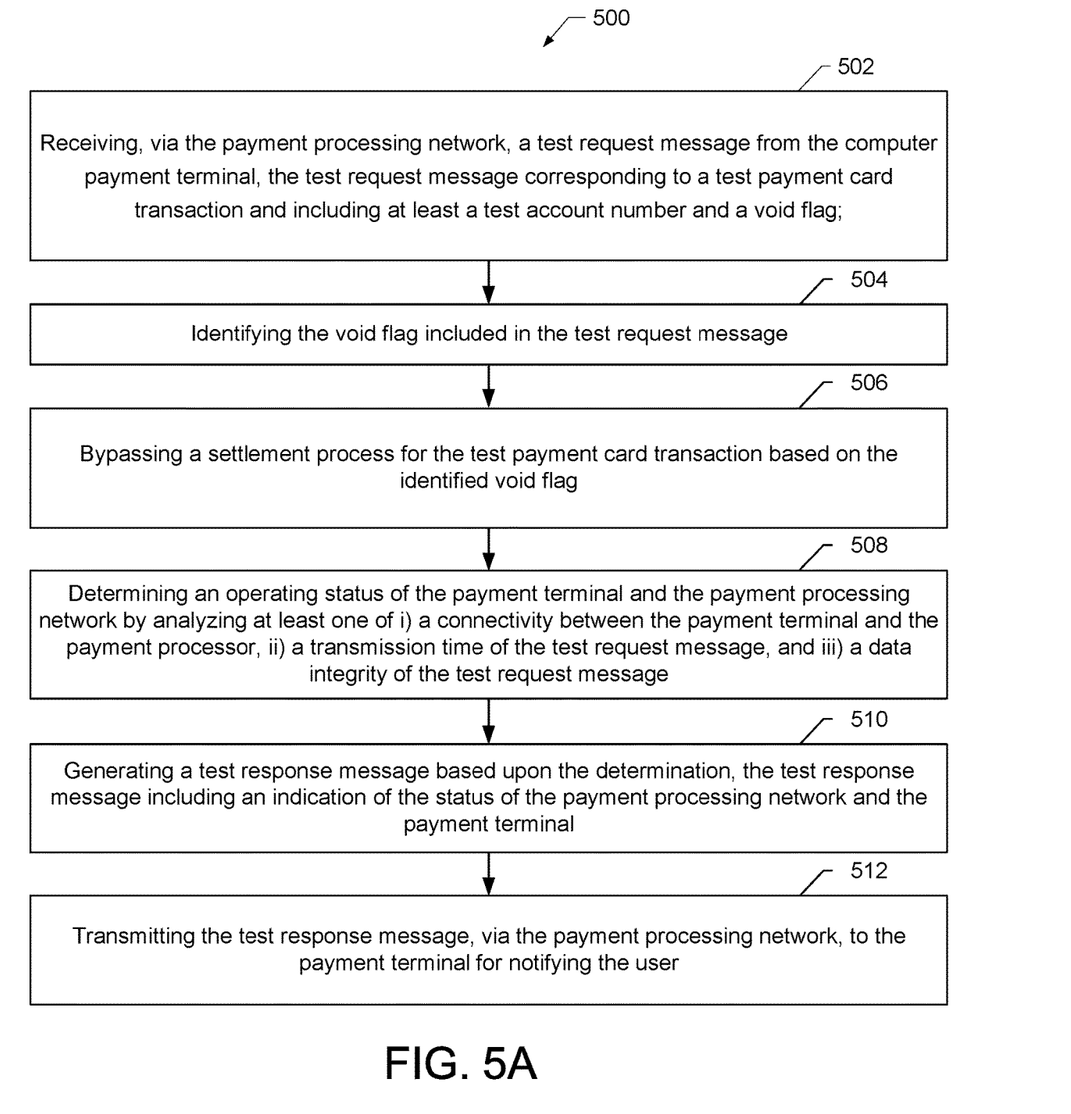
FIG. 5A is a flow diagram illustrating an example method for verifying operations of payment terminals and payment processing networks using the verification computing system shown in FIG. 1.

FIG. 5A is a flow diagram illustrating an example method 500 for verifying operations of payment terminals, such as payment terminal 104, and payment processing networks, such as payment processing network 108, using verification computing system 100. Verification computing system 100 includes at least one verification computing module 106 in communication with a database, such as database 110 (all shown in FIG. 1). Method 500 includes receiving 502, via payment processing network 108, a test request message from payment terminal 104, the test request message initiated by a user and corresponding to a test payment card transaction, the test request message including at least a test account number and a void flag. Method 500 also includes identifying 504 the void flag included in the test request message, bypassing 506 a settlement process for the test payment card transaction based on the identified void flag, and determining 508 an operating status of payment terminal 106 and payment processing network 108 by analyzing at least one of i) a connectivity between payment terminal 106 and payment processor 108, ii) a transmission time of the test request message, and iii) a data integrity of the test request message. Method 500 further includes generating 510 a test response message based upon the determination, the test response message including an indication of the status of payment processing network 108 and payment terminal 104, and transmitting 512 the test response message, via payment processing network 108, to payment terminal 104 for notifying the user.

Figure 5B:
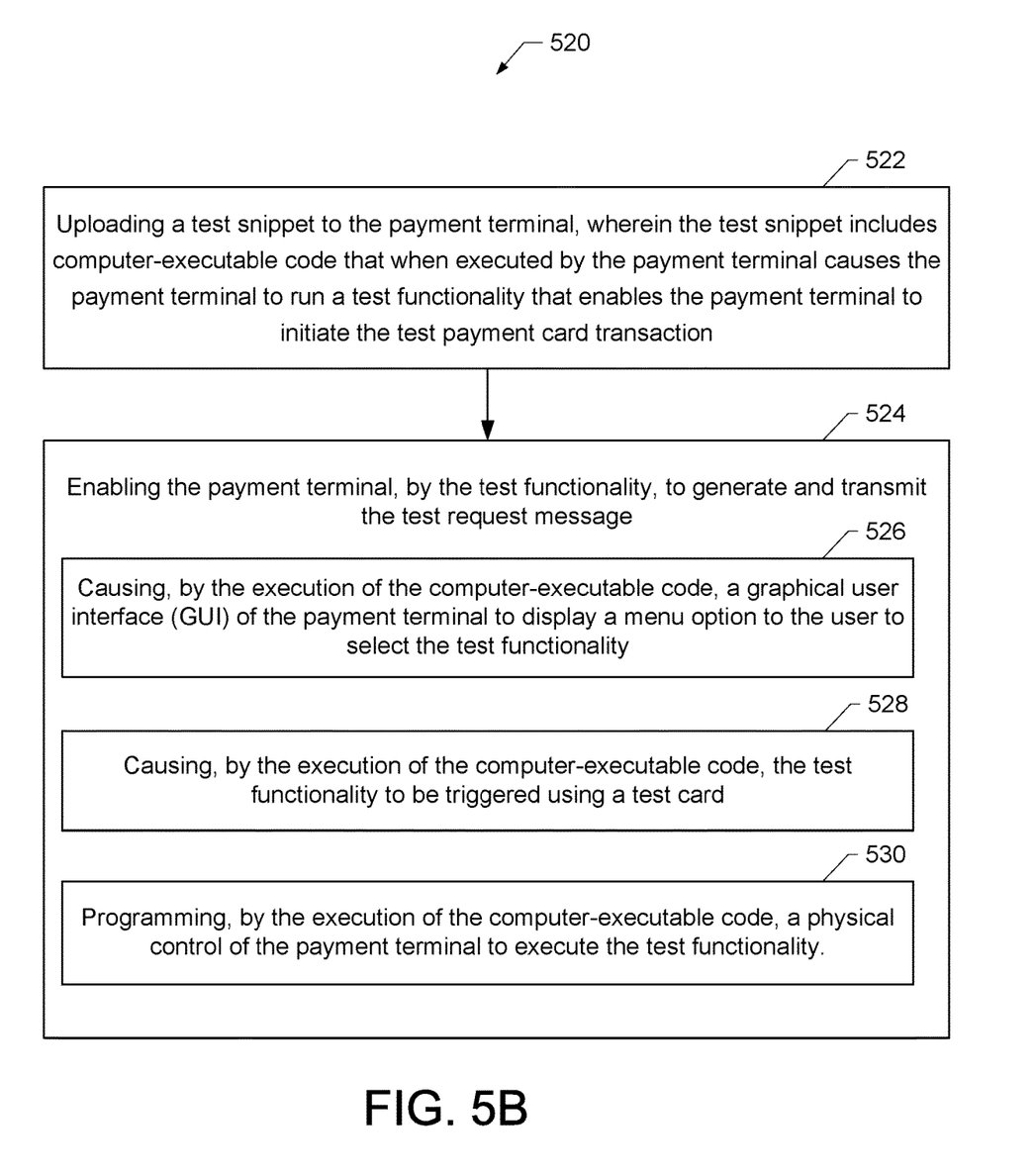
FIG. 5B is a flow diagram illustrating an example method for implementing a test snippet using the verification computing system shown in FIG. 1.

FIG. 5B is a flow diagram illustrating an example method 520 by which verification computing system 100 uses a test snippet implemented by at least one verification computing module 106, where the test snippet causes payment terminal 104 to initiate verification of operation of payment terminal 104 and payment processing network 108 (all shown in FIG. 1). Method 520 includes uploading 522 a test snippet to payment terminal 104, wherein the test snippet includes computer-executable code that, when executed by payment terminal 104, causes payment terminal 104 to run test functionality 102 (shown in FIG. 1) that enables payment terminal 104 to initiate the test payment card transaction. Method 520 also includes enabling 524 payment terminal 104, by test functionality 102, to generate and transmit the test request message.

In some embodiments, step 524 includes causing 526, by the execution of the computer-executable code, a graphical user interface (GUI) of payment terminal 104 to display a menu option to the user to select test functionality 102. In certain embodiments, step 524 includes causing 528, by the execution of the computer-executable code, test functionality 102 to be triggered using a test card. In some embodiments, step 524 includes programming 530, by the execution of the computer-executable code, a physical control of payment terminal 104 to execute test functionality 102 in response to user manipulation of the physical control. Alternatively, step 524 is implemented in any suitable fashion.

Figure 5C:
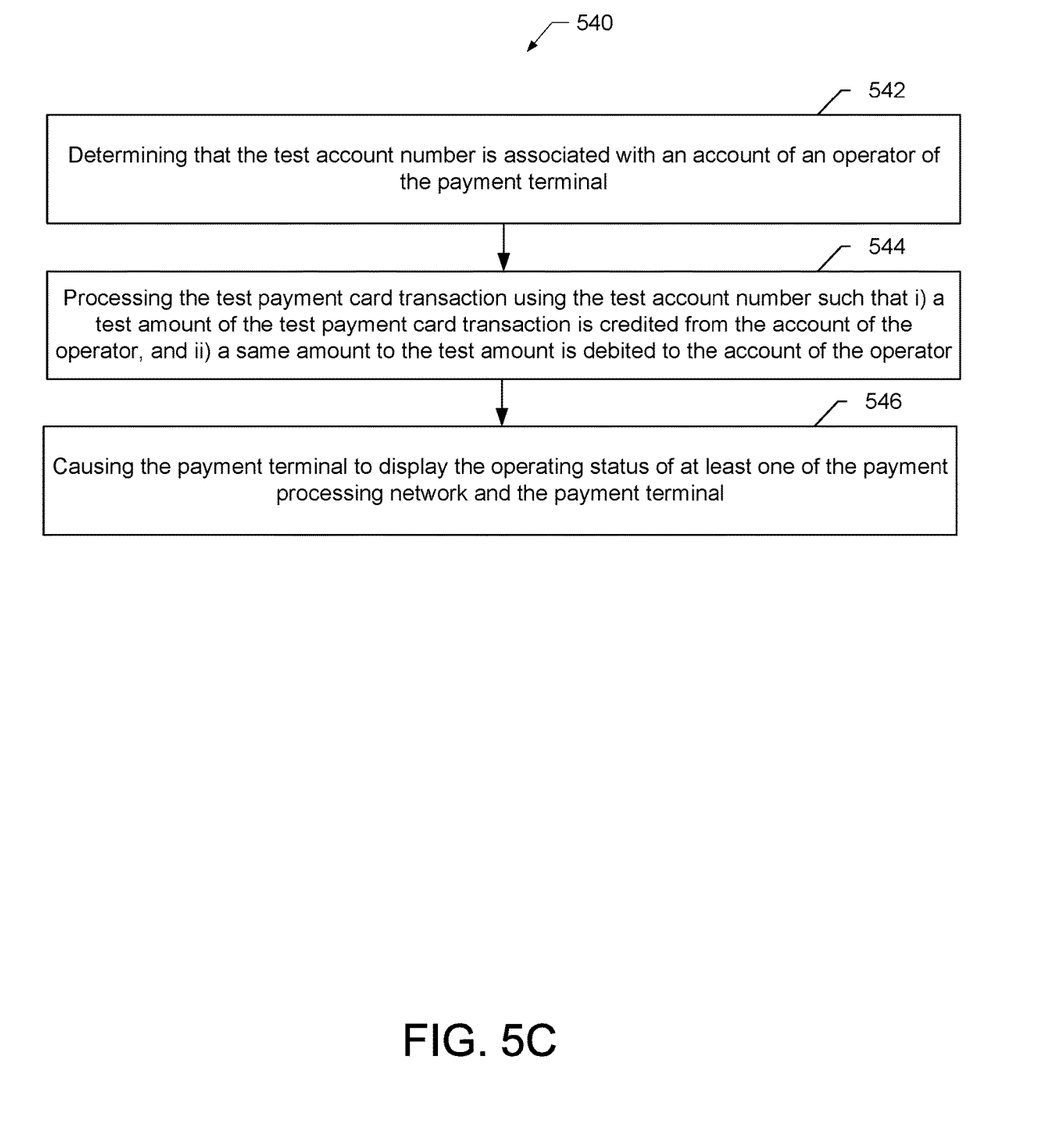
FIG. 5C is a flow diagram illustrating an example method for processing a test payment card transaction using the verification computing system shown in FIG. 1.

FIG. 5C is a flow diagram illustrating an example method 540 by which verification computing system 100 processes a test payment card transaction for verifying operation of payment terminal 104 and payment processing network 108 (all shown in FIG. 1). Method 540 is implemented by at least one verification computing module 106 in communication with a database, such database 110 (both shown in FIG. 1). Method 540 includes determining 542 that a test account number is associated with an account of an operator of payment terminal 104, and processing 544 the test payment card transaction using the test account number such that i) a test amount of the test payment card transaction is credited from the account of the operator, and ii) a same amount to the test amount is debited to the account of the operator. Method 540 also includes causing 546 payment terminal 104 to display the operating status of at least one of payment processing network 104 and payment terminal 108.

Figure 6:
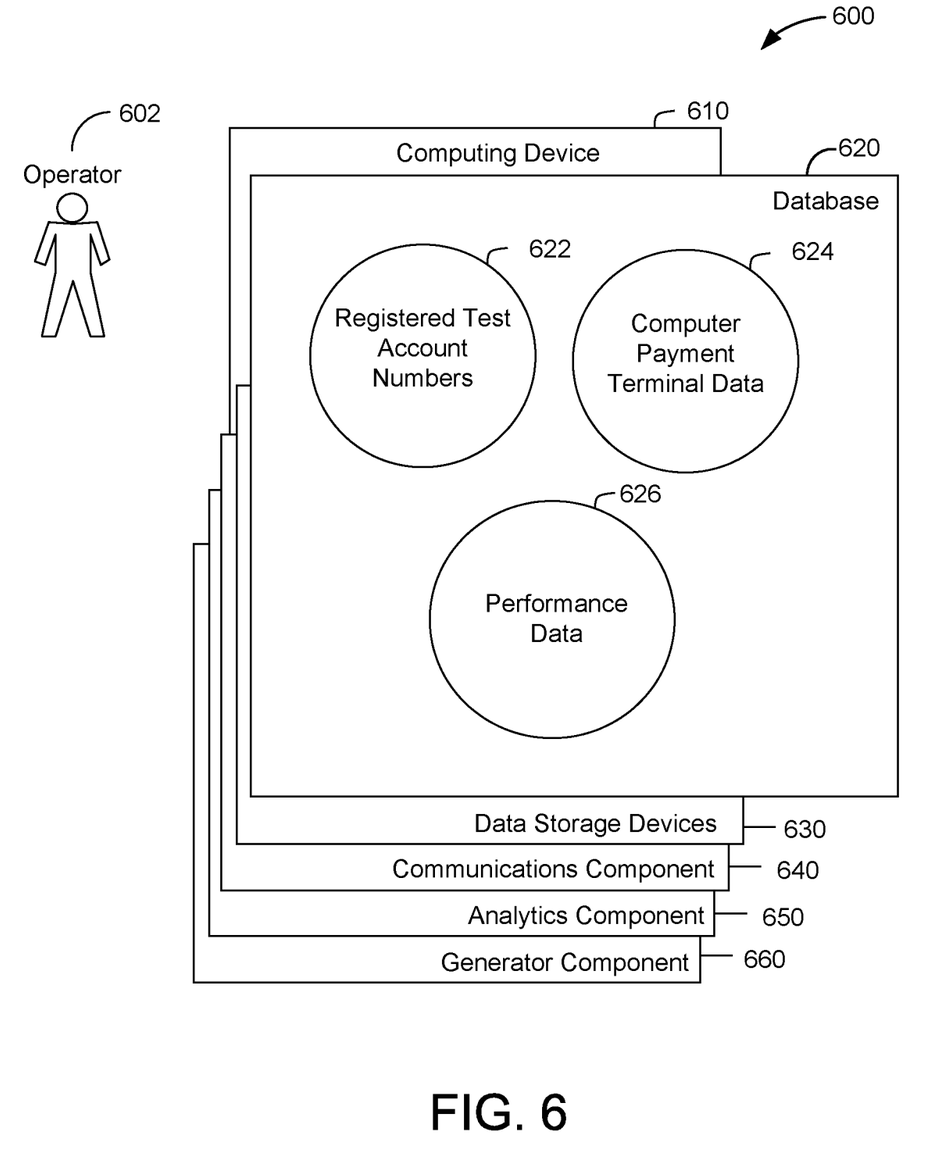
FIG. 6 illustrates an example configuration of a database within a computing device, along with other related computer components, that may be used to verify operation of payment terminals and payment processing networks using the verification computing system shown in FIG. 1.

FIG. 6 is a diagram 600 of computer components of one or more example computing devices that may be used in verification computing system 100, as shown in FIG. 1. In some embodiments, computing device 610 is used to implement verification computing module 106 (shown in FIG. 1). The computer components may be used to verify operation of payment terminal 104 and payment processing network 108 (both shown in FIG. 1). Operator 602 (such as a user operating verification computing module 106) may access computing device 610 in order to service computing device 610. In some embodiments, database 620 is similar to database 110 and/or database 112 (both shown in FIG. 1). Database 620 may be coupled with several separate components within computing device 610, which perform specific tasks. In the example embodiment, database 620 includes registered test account numbers 622, payment terminal data 624, and performance data 626.

Computing device 610 includes database 620, as well as storage devices 630, for storing data within database 620, such as storing registered test account numbers 622, payment terminal data 624, and performance data 626. Computing device 610 also includes communications component 640 for receiving 502 (shown in FIG. 5), via payment processing network 108, a test request from payment terminal 104 (both shown in FIG. 1), and transmitting 512 (shown in FIG. 5) a test response message, via payment processing network 108, to payment terminal 104.

Computing device 610 further includes analytics component 650 for identifying 504 (shown in FIG. 5) a void flag included in the test request message, and determining 506 (shown in FIG. 5) no settlement is required for the test payment card transaction based on the identified void flag. Computing device 610 further includes generator component 660 for generating 510 (shown in FIG. 5) a test response message indicative of a status of payment processing network 108.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for various aspects of fraud analysis for registration of merchants with acquirer banks. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the verification computing module are described herein as including general processing and memory devices, it should be understood that the verification computing module is a specialized computer configured to perform the steps described herein for verifying operation of payment terminals and payment processing networks.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claim is:

1. A verification computing system for verifying operation of a payment terminal and a payment processing network linking the payment terminal to a payment processor associated with the payment processing network, the verification computing system including at least one verification computing module including at least one processor programmed to:
    upload a test snippet on the payment terminal, wherein the test snippet includes computer-executable code that when executed by the payment terminal causes the payment terminal to run a test functionality that enables the payment terminal to initiate a test payment card transaction and generate a test request message;
    in response to initiating the test payment card transaction, receive, via the payment processing network, the test request message from the payment terminal, the test request message initiated by a user and corresponding to the test payment card transaction, the test request message including at least a test account number and a void flag;
    identify the void flag included in the test request message;
    bypass a settlement process for the test payment card transaction based on the identified void flag;
    determine an operating status of the payment terminal and the payment processing network by analyzing at least one of i) a connectivity between the payment terminal and the payment processor, ii) a transmission time of the test request message, and iii) a data integrity of the test request message, wherein the operating status indicates data safety risk associated with a compromise of the payment terminal, a compromise of the payment processing network, and an insecure transmission of account and consumer information, thereby enhancing security of the payment terminal and the payment processing network;
    generate a test response message based upon the determination, the test response message including an indication of the operating status of the payment processing network and the payment terminal; and
    transmit the test response message, via the payment processing network, to the payment terminal for notifying the user.

2. The verification computing system of claim 1, wherein the test functionality enables the payment terminal to transmit the test request message.

3. The verification computing system of claim 1, wherein the computer-executable code, when executed by the payment terminal, causes a graphical user interface (GUI) of the payment terminal to display a menu option to the user to select the test functionality.

4. The verification computing system of claim 1, wherein the computer-executable code, when executed by the payment terminal, programs a physical control of the payment terminal to execute the test functionality.

5. The verification computing system of claim 1, wherein the computer-executable code, when executed by the payment terminal, causes the test functionality to be triggered using a test card.

6. The verification computing system of claim 1, wherein the test account number is pre-programmed into the test functionality at the payment terminal.

7. The verification computing system of claim 1, wherein the at least one processor is further programmed to cause the payment terminal to display the operating status of at least one of the payment processing network and the payment terminal.

8. The verification computing system of claim 1, wherein the at least one processor is further programmed to:
    determine that the test account number is associated with an account of an operator of the payment terminal; and process the test payment card transaction using the test account number such that i) a test amount of the test payment card transaction is credited from the account of the operator, and ii) a same amount to the test amount is debited to the account of the operator.

9. The verification computing system of claim 1, wherein the test response message includes a timestamp of receipt of the test request message by the payment processing network and a timestamp of transmission of the test response message from the payment processing network.

10. A computer-implemented method for verifying operation of a payment terminal and a payment processing network linking the payment terminal to a payment processor associated with the payment processing network, the method implemented by at least one verification computing module including at least one processor in communication with a database, said method comprising:

uploading a test snippet on the payment terminal, wherein the test snippet includes computer-executable code that when executed by the payment terminal causes the payment terminal to run a test functionality that enables the payment terminal to initiate a test payment card transaction and generate a test request message;

in response to initiating the test payment card transaction, receiving, via the payment processing network, the test request message from the payment terminal, the test request message initiated by a user and corresponding to the test payment card transaction, the test request message including at least a test account number and a void flag;

identifying the void flag included in the test request message;

bypassing a settlement process for the test payment card transaction based on the identified void flag;

determining an operating status of the payment terminal and the payment processing network by analyzing at least one of i) a connectivity between the payment terminal and the payment processor, ii) a transmission time of the test request message, and iii) a data integrity of the test request message, wherein the operating status indicates data safety risk associated with a compromise of the payment terminal, a compromise of the payment processing network, and an insecure transmission of account and consumer information, thereby enhancing security of the payment terminal and the payment processing network;

generating a test response message based upon the determination, the test response message including an indication of the operating status of the payment processing network and the payment terminal; and transmitting the test response message, via the payment processing network, to the payment terminal for notifying the user.

11. The computer-implemented method of claim 10, wherein the test functionality enables the payment terminal to transmit the test request message.

12. The computer-implemented method of claim 10, wherein the computer-executable code, when executed by the payment terminal, causes a graphical user interface (GUI) of the payment terminal to display a menu option to the user to select the test functionality.

13. The computer-implemented method of claim 10, wherein the computer-executable code, when executed by the payment terminal, programs a physical control of the payment terminal to execute the test functionality.

14. The computer-implemented method of claim 10, wherein the computer-executable code, when executed by the payment terminal, causes the test functionality to be triggered using a test card.

15. The computer-implemented method of claim 10, wherein the method further comprises causing the payment terminal to display the operating status of at least one of the payment processing network and the payment terminal.

16. The computer-implemented method of claim 10, wherein the method further comprises:

determining that the test account number is associated with an operator of the payment terminal; and processing the test payment card transaction using the test account number such that i) a test amount of the test payment card transaction is credited from an account of the operator, and ii) a same amount to the test amount is debited to the account of the operator.

17. A non-transitory computer-readable storage medium having computer-executable instructions embodied thereon, wherein when executed by at least one verification computing module including at least one processor in communication with a database, the computer-executable instructions cause the verification computing module to:

upload a test snippet on a payment terminal, wherein the test snippet includes computer-executable code that when executed by the payment terminal causes the payment terminal to run a test functionality that enables the payment terminal to initiate a test payment card transaction and generate a test request message;

in response to initiating the test payment card transaction, receive, via a payment processing network linking the payment terminal to a payment processor associated with the payment processing network, the test request message from the payment terminal, the test request message initiated by a user and corresponding to the test payment card transaction, the test request message including at least a test account number and a void flag;

identify the void flag included in the test request message;

bypass a settlement process for the test payment card transaction based on the identified void flag;

determine an operating status of the payment terminal and the payment processing network by analyzing at least one of i) a connectivity between the payment terminal and the payment processor, ii) a transmission time of the test request message, and iii) a data integrity of the test request message, wherein the operating status indicates data safety risk associated with a compromise of the payment terminal, a compromise of the payment processing network, and an insecure transmission of account and consumer information, thereby enhancing security of the payment terminal and the payment processing network;

generate a test response message based upon the determination, the test response message including an indication of the operating status of the payment processing network and the payment terminal; and transmit the test response message, via the payment processing network, to the payment terminal for notifying the user.

* * * * *